United States Patent
Yan et al.

[11] Patent Number: 5,982,973
[45] Date of Patent: Nov. 9, 1999

[54] ERBIUM-DOPED PLANAR WAVEGUIDE

[75] Inventors: Yingchao Yan, Eindhoven; Anne Jans Faber, Veldhoven, both of Netherlands

[73] Assignee: Nederlandse Organisatie voor toegepast-natuurwetenschappelijk Onderzoek TNO, Netherlands

[21] Appl. No.: 09/046,440

[22] Filed: Mar. 24, 1998

[30] Foreign Application Priority Data

Mar. 27, 1997 [EP] European Pat. Off. ............... 97200930

[51] Int. Cl.⁶ ..................................... G02B 6/00

[52] U.S. Cl. ........................ 385/141; 385/142; 385/129; 372/40

[58] Field of Search ..................... 385/141, 142, 385/144, 129, 132; 372/40, 41; 501/48; 252/301.4 P

[56] References Cited

U.S. PATENT DOCUMENTS

| | | | |
|---|---|---|---|
| 5,032,315 | 7/1991 | Hayden et al. | 252/301.4 P |
| 5,206,925 | 4/1993 | Nakazawa et al. | 385/132 |
| 5,334,559 | 8/1994 | Hayden | 501/48 |
| 5,491,708 | 2/1996 | Malone | 372/41 |
| 5,526,369 | 6/1996 | Hayden et al. | 372/40 |

OTHER PUBLICATIONS

Yingchao Yan, et al; "Luminescence Quenching by OH Groups in Highly Er-doped Phosphate Glasses", Journal of Non-Crystaline Solids vol. 181, No. 3 (Feb. 1995) pp. 283-290.

Yingchao Yan, et al; "Er/sup 3+/ Phosphate Glasses Optical Waveguide Amplifiers at 1.5μm on Silicon"; Functional Photonic and Fiber Devices, San Jose, CA, USA, Jan. 30–Feb. 1, 1996, vol. 2695, Proceedings for the SPIE—The International Society for Optical Engineering, 1996, SPIE--Int. Soc Opt. Eng, USA, pp. 144–148.

*Primary Examiner*—Hemang Sanghavi

[57] ABSTRACT

The present invention relates to a planar optical waveguide device, especially an optical amplifier, comprising: a substrate (11); an active guiding layer (13) arranged on the substrate (11); a bottom layer (12) arranged between the active guiding layer (13) and the substrate (11); a top cladding layer (14) arranged over the active guiding layer (13).

According to the invention, the active guiding layer (13) has the following composition:

| | |
|---|---|
| $Al_2O_3$ | 8–20 mol % |
| $Na_2O$ | 5–18 mol % |
| $La_2O_3$ | 6–35 mol %, preferably 10–30 mol % |
| $R_2O_3$ | >0–6 mol %, preferably 0.5–1.5 mol % |
| $P_2O_5$ | balance | wherein, R represents Erbium (Er), Neodymium (Nd), or Ytterbium (Yb), or a combination of Er+Yb.

8 Claims, 3 Drawing Sheets

ERBIUM-DOPED PLANAR WAVEGUIDE

BACKGROUND OF THE INVENTION

The present invention relates to a planar optical waveguide.

An optical waveguide is an important component in the field of telecommunication. A special type of optical waveguide is a planar optical waveguide, which can be manufactured as a part of an integrated circuit.

Nowadays, optical signals are very important for transmitting information. However, when an optical signal is transmitted through an optical fiber, attenuation will always occur to a certain extent, such that it is necessary to amplify the signal after a certain distance (typically in the order of about 50–100 km). Conventionally, for that purpose an electronic amplifier is used. At the amplifier station, the optical signal must then be converted into an electrical signal, which is amplified in an electronic amplifier, after which the amplified electrical signal is converted back into an optical signal. This involves not only the disadvantage that an amplifier station has a rather complicated structure with rather a large number of parts, among which optical/electrical converters and electrical/optical converters, but this also implies that the bandwith and bit-rate of the overall system is limited by the electronical components.

Therefore, optical fibre amplifiers have recently been developed, i.e. amplifiers which amplify the optical signal directly and do not need a conversion into an electrical signal.

Similarly, integrated planar waveguide amplifiers are of necessity in order to realize all-optical telecommunication. For example, a planar waveguide amplifier can be integrated with a passive splitter as loss-compensating components. Due to their small sizes, planar optical waveguide amplifiers are expected to be of low cost, and more importantly, they offer the promise of integrating passive and active functions on the same substrate.

Materials for planar optical waveguides can be divided into different categories, among which:

(1) crystalline materials ($LiNbO_3$, $Al_2O_3$, $Y_2O_3$, etc.)

(2) glassy materials, such as silicate-glass (based on $SiO_2$), phosphate-glass (based on $P_2O_5$), etc.

SUMMARY OF THE INVENTION

The present invention relates to an optical waveguide material of this last-mentioned category, more specifically, phosphate-glass.

An optical waveguide material of this category is described in U.S. Pat. No. 5,491,708. This publication describes a substrate having the following composition:

| | |
|---|---|
| $P_2O_5$ | 50–70 mol % |
| $Al_2O_3$ | 4–13 mol % |
| $Na_2O$ | 10–35 mol % |
| $La_2O_3$ | 0–6 mol % |
| $R_2O_3$ | >0–6 mol % | wherein R is a lanthanide.

The lanthanide used in such composition can be considered as "active" component, as will be explained later. Generally speaking, in view of the fact that a planar waveguide device has a rather short length in the order of a few centimeters, the concentration of the lanthanide needs to be relatively high, and the pump power density needs to be relatively high for obtaining a sufficient optical amplifcation gain. Although it is technically possible to manufacture a waveguide material with a relatively high concentration of the lanthanide, the luminescence will be quenched by energy transfer processes due to ion-ion interactions. Furthermore, another cooperative upconversion quenching process dominates the amplification process of the devices when a high pump power is applied. These two luminescence quenching processes strongly influence the amplifier efficiency of planar waveguides amplifiers.

In the publication "Fabrication of Er Doped Glass Films as used in Planar Optical Waveguides" by Gates cs in Mat. Res. Soc. Symp. Proc. Vol. 392, 1995, an Er-doped soda-lime silicate glass film on silicon is described. In a specific experiment, represented in FIG. 10 of said publication, a 4.5 cm long waveguide containing 5.5 wt % $Er_2O_3$ was found to achieve about 4.2 dB/cm gain. However, in order to achieve result, this prior art waveguide needs a pump power in excess of 350 mW.

It is a particular purpose of the invention to provide an improved planar optical waveguide which can function as an optical amplifier.

It is a more particular purpose of the invention to provide an improved planar optical waveguide which can function as an optical amplifier for optical signals having wavelengths in the range of about 1.53 μm.

Especially, the present invention seeks to provide a material for an optical waveguide which has a good efficiency and which shows a relatively high amplification with relatively low pump power.

BRIEF DESCRIPTION OF THE DRAWINGS

Hereinafter, the invention will be explained in more detail with reference to the drawing, in which.

DETAILED DESCRIPTION OF THE INVENTION

Figure 1:
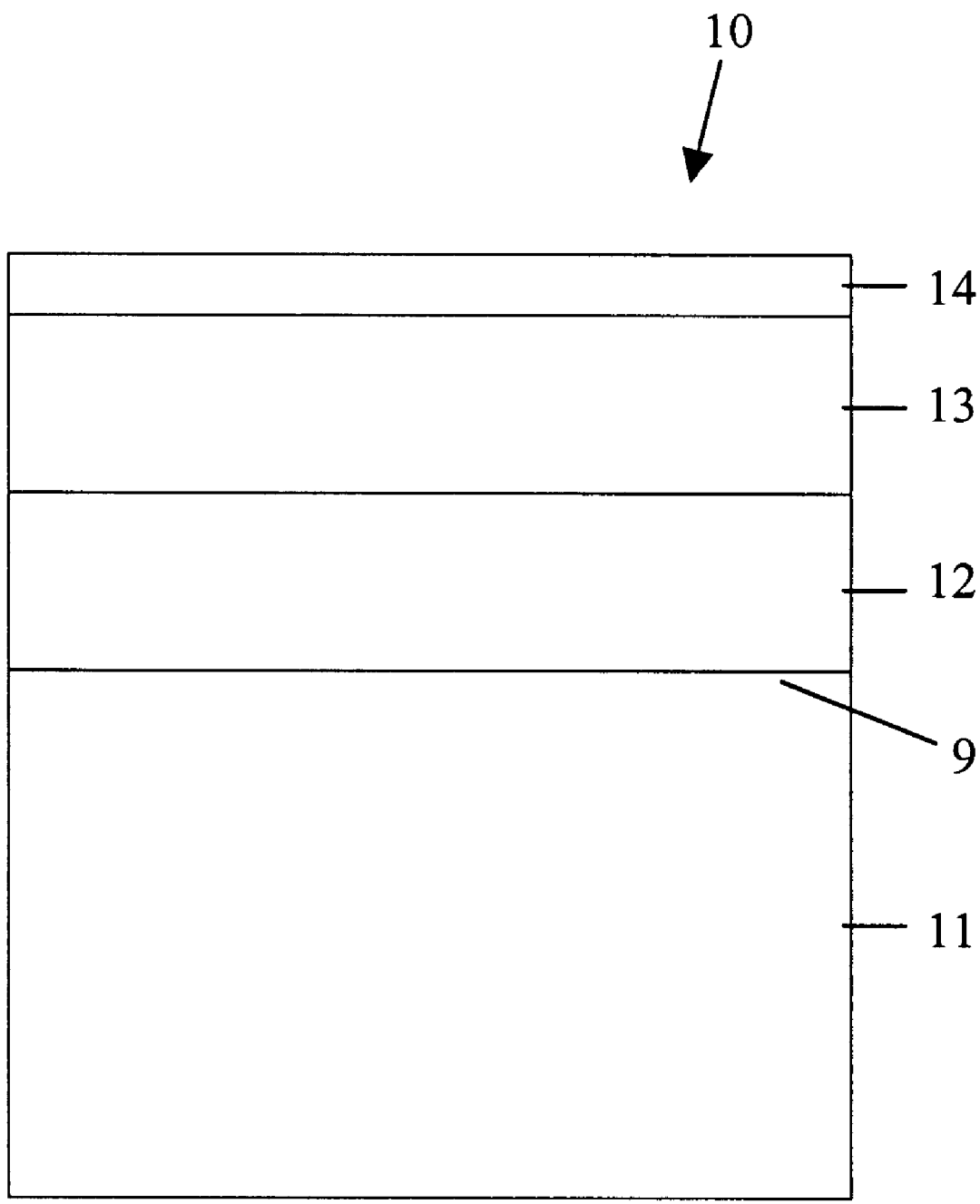
FIG. 1 schematically shows a cross-section of a planar optical waveguide device.

FIG. 1 schematically shows a cross-section of a planar optical waveguide device, generally indicated at 10. The planar optical waveguide device 10 comprises a substrate 11, a buffer layer 12 arranged on a surface 9 of the substrate 11, an active guiding layer 13 arranged on the buffer layer 12, and a top cladding layer 14 arranged on the active guiding layer 13. The active guiding layer 13, which can for instance have a thickness of about 1 μm, functions as the actual guide for light beams in a direction parallel to said surface 9.

The light beam can not escape from the active guiding layer 13 in the direction perpendicular to said surface 9, also indicated as the transverse direction, because the refractive indices of the buffer layer 12 and the top cladding layer 14 are lower than the refractive index of the active guiding layer 13. In an effective embodiment, the buffer layer 12 consists of $SiO_2$, which can be arranged on the substrate 11 by thermally oxidising the substrate 11, as is known per se; the buffer layer 12 can for instance have a thickness of about 6.5 μm. Similarly, the top cladding layer 14 can consist of $SiO_2$, which can be arranged on the active guiding layer 13 by sputtering, as is known per se; the top cladding layer 14 can for instance have a thickness of about 0.5 μm.

Further, within the active guiding layer 13 the light beam can only be transported in one direction parallel to said surface 9, indicated here as the guiding direction. The direction parallel to said surface 9 but perpendicular to said guiding direction will be indicated here as lateral direction. The light is confined in the lateral direction by a suitable shaping of either the active guiding layer 13 or the top cladding layer 14 such that a suitable refractive index profile is obtained in the lateral direction, as is known per se and not shown in FIG. 1.

The active guiding layer 13 has to satisfy several requirements in order for the guiding layer to be suitable in an optical waveguide, in an optical amplifier, or in a laser. The active guiding layer 13 should have a relatively high refractive index and a low optical attenuation, preferably <1 dB/cm at the applied wavelengths. Further, the active guiding layer 13 should have efficient optical amplification properties, for instance characterised by the luminescence efficiency of the active ions, like Er-ions. A very important feature of the active guiding layer 13 is the optical gain at a specific wavelength (region), expressed in dB/cm: it is a specific objective of the invention to obtain a relatively high gain with a relative low pump power. More specifically, it is an objective of the invention to provide an active guiding layer 13 which offers a gain of >4 dB/cm at a relatively low pump power (preferably less than 50 mW) for the wavelength of about 1.53 μm.

According to an important feature of the invention, the active guiding layer 13 is manufactured as a phosphate glass having the following composition:

| | |
|---|---|
| $Al_2O_3$ | 8–20 mol % |
| $Na_2O$ | 5–18 mol % |
| $La_2O_3$ | 6–35 mol %, preferably 10–30 mol % |
| $R_2O_3$ | >0–6 mol %, preferably 0.5–1.5 mol % |
| $P_2O_5$ | balance |

Herein, R represents Erbium (Er), Neodymium (Nd), or Ytterbium (Yb), or a combination of Er+Yb, depending on the wavelength of the optical waves which are to be guided and amplified. For applications where the optical wavelength is about 1.53 μm, R represents Er.

For applying the active guiding layer 13 onto the buffer layer 12, several techniques can be used. A method which is particularly suitable, and which is used in the present invention, is RF sputtering. This technique is known per se, for which reason it will be discussed here only briefly. In a vacuum chamber, a target having a suitable composition with regard to the desired composition of the active guiding layer to be deposited, is arranged opposite a substrate. In the vacuum chamber, argon and oxygen are introduced, such that the pressure in the vacuum chamber is in the range of about 0.3 to 5 Pa. RF power is applied to the target. The target is hit by argon atoms, such that atoms and/or molecules of the target are emitted from the target and deposited on the substrate. This process is continued until the deposited layer has sufficient thickness.

It will be clear to a person skilled in the art, that other techniques can be used for applying the active guiding layer 13 onto the substrate, and that the invention is not restricted to the technique described above.

The present invention relates particularly to an optical waveguide device having an active guiding layer which comprises Erbium as active component. Therefore, in the following a description will be given of an optical amplification mechanism based on Erbium.

Figure 2:
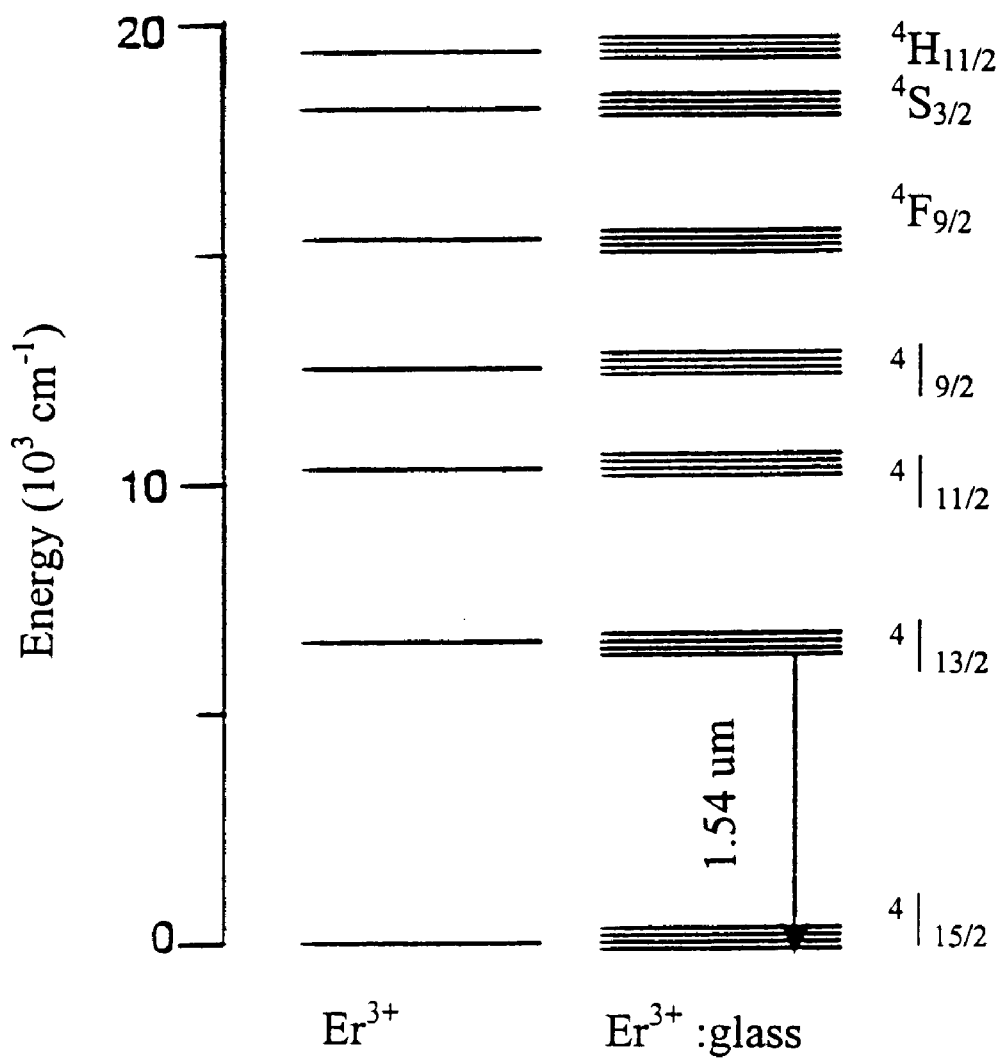
FIG. 2 schematically shows an energy diagram for Er.

Erbium is a well-known rare-earth metal. The electronic structure of $Er^{3+}$ is $[Xe]4f^{11}$, of which the partially filled 4f shell is electronically shielded by the outlying filled $5s^25p^6$ shells from the Xe configuration. FIG. 2 shows schematically the energy diagram for the 4f electrons of a free $Er^{3+}$ ion (left hand side) and of an $Er^{3+}$ ion is a solid (right hand side). The various levels arise from spin-spin interactions and spin-orbit interactions. The energy levels are labeled as $^{2S+1}L_J$, wherein S represents the spin, L represents the orbit, and J represents the total angular momentum.

In the free $Er^{3+}$ ion, the 4f transitions are parity forbidden. In a solid such as a glass, however, the presence of surrounding atoms weakly perturbs the 4f states. The electric dipole transitions become allowed due to admixing of states of opposite parity from higher configuration into the 4f configuration. Due to the Stark-effect, the degenerate levels split into manifolds (see the right hand side of FIG. 2). In addition to this host-dependent forced electric dipole contribution, the $^4I_{13/2}-^4I_{15/2}$ transition of Erbium at 1.53 μm has considerable magnetic dipole strength which is relatively insensitive to the host material. The spontaneous emission lifetime of the $^4I_{13/2}-^4I_{15/2}$ transition of Erbium at 1.53 μm in a solid can be as long as about 10 ms.

Figure 3:
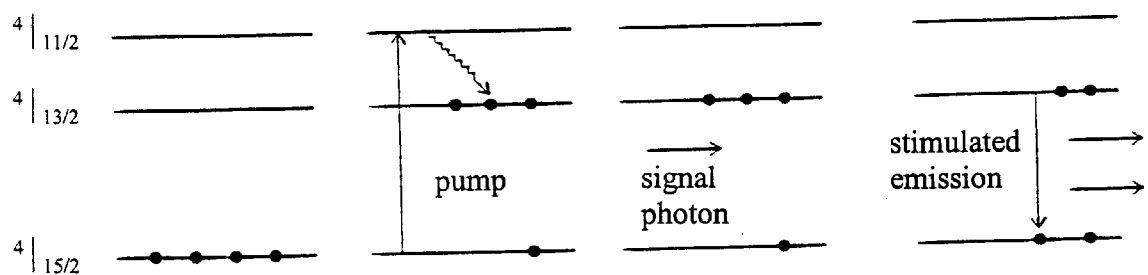
FIG. 3 shows a schematic illustration of an amplification process.

FIG. 3 shows a schematic illustration of the amplification process for the three-level system of $Er^{3+}$, involving the states $^4I_{11/2}$, $^4I_{13/2}$ and $^4I_{15/2}$.

By absorbing pump energy, $Er^{3+}$ ions can be excited to a state lying above the $4I_{13/2}$ state, such as the $4I_{11/2}$ state exemplified in FIG. 3. From this excited state, $Er^{3+}$ ions quickly decay to the metastable $4I_{11/2}$ manifold via non-radiative relaxation. Stimulated emission from the $4I_{13/2}$ state to the ground $4I_{15/2}$ state can cause amplification of light at 1.53 μm. The light amplification due to electronic transitions of $Er_{3+}$ works in a three-level lasing scheme. Light amplification in a three-level system can occur only when more than half of the population is excited to the upper lasing level (i.e. the $4I_{13/2}$ level for $Er^{3+}$).

The principles of Er-doped optical amplifiers are the same for fiber waveguides and planar waveguides. However, in view of the required high Er doping levels in planar waveguide devices, planar waveguide devices are less efficient than fiber waveguide devices, The efficiency of the Er-doped waveguide amplifiers is influenced by two quenching processes, which are both related to the high Er doping levels, as will be discussed hereunder.

The first quenching process is concentration quenching. With increasing concentration of Er in the waveguide, the probability increases that an excited $Er^{3+}$ ion transfers its energy to a neighboring $Er^{3+}$ ion in the ground state via ion-ion interaction. Such process may be repeated until the energy is transferred to an $Er^{3+}$ ion correlated with a defect or an impurity ion, and the energy may be lost via non-radiative decay.

Figure 4:
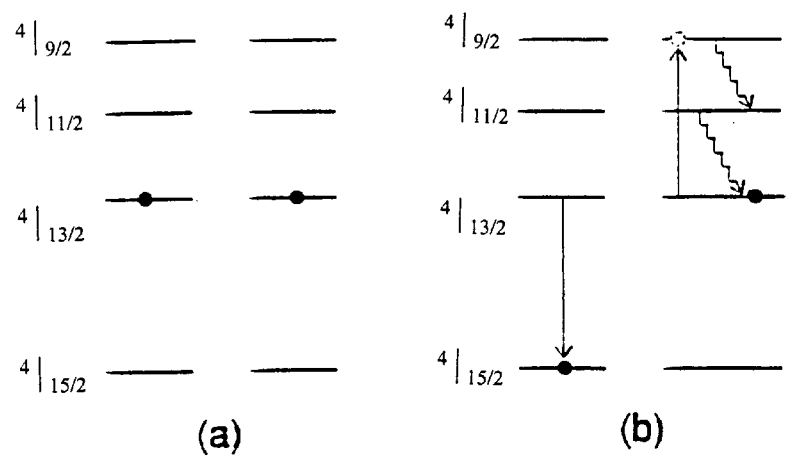
FIG. 4 schematically illustrates a co-operative upconversion process.

The second quenching process, which is believed to be the dominant process causing the inefficiency of prior Er-doped waveguide devices, is a co-operative upconversion process, which is also due to ion-ion interactions. This process, which plays a role especially when the population inversion is high, is illustrated in FIG. 4. With increasing concentration of Er in the waveguide, the probability increases that an excited $Er^{3+}$ ion transfers its energy to a neighboring excited $Er^{3+}$ ion. Then, the first $Er^{3+}$ ion may decay non-radiatively to the ground $^4I_{15/2}$ state, while the second $Er^{3+}$ ion is excited to a higher lying state $^4I_{9/2}$. This second $Er^{3+}$ ion then has a high probability to decay to the $^4I_{13/2}$ state via non-radiative relaxation. The net result of this upconversion process is that the population in the upper lasing state of $^4I_{13/2}$ is strongly reduced and the efficiency of light amplification at 1.53 μm by stimulated emission is strongly decreased.

The upconversion quenching process is a property which is related to the host material, i.e. the waveguide material into which the Er ions are embedded, since it is caused by the ion-ion interactions of $Er^{3+}$ ions in the host.

Therefore, an important feature of the present invention is the composition of the host material.

EXAMPLE

An optical waveguide device was manufactured in accordance with FIG. 1. As basis material, a standard silicon substrate was used, in the shape of a circular disk having a diameter of about 7.5 cm. By way of a standard thermal oxidisation process, a buffer layer 12 having a thickness of about 6.5 μm was applied on the substrate.

A suitable glass target was prepared by mixing and melting $Al_2O_3$, $Na_2O$, $La_2O_3$, $P_2O_5$, and $Er_2O_3$, in a suitable proportion. This target was positioned opposite said oxidised substrate in a standard sputtering chamber, and by way of a standard low-pressure magnetron RF sputtering process as briefly discussed above, an active guiding layer 13 having a composition (determined by X-ray photoelectron spectroscopy) as specified hereunder in Table 1 was applied on the buffer layer 12.

TABLE 1

| | |
|---|---|
| $P_2O_5$ | 42–45 mol % |
| $Al_2O_3$ | 16–18 mol % |
| $Na_2O$ | 8.5–11 mol % |
| $La_2O_3$ | 27–28 mol % |
| $Er_2O_3$ | 0.9–1.2 mol % |

The process was continued for about 4 hours. The thickness of the active guiding layer 13 was measured, and appeared to be about 1 μm.

By way of a standard sputtering process, a top cladding layer 14 of $SiO_2$ was applied over said structure, the top cladding layer 14 having a thickness of about 0.5 μm.

Then, by way of standard photolithography and etching processes, most part of the layer 14 was removed to form stratified line strips of 4 μm wide, providing lateral confinement of the guided light in the active layer 13.

Finally, the active guiding layer 13 was made into a structure having a length of 10 mm by cleaving the silicon substrate.

This planar waveguide device was tested for its optical properties. It appeared that the active guiding layer 13 had a refractive index of about 1.56 at 633 nm; with such a high refractive index, a high light confinement can be obtained in the waveguide, which leads to a high density of the pump power. For a wavelength of 1.53 μm, an optical confinement of about 70% was obtained.

The optical amplification for light having a wavelength of 1.53 μm was measured, wherein pump light having a wavelength of 980 nm was applied to the planar waveguide device. For this experimental planar waveguide device having a length of 10 mm, a net optical gain of 4.1 dB was measured with a pump power of about 65 mW. This pump power is already very low. It is noted, however, that in this experiment the coupling efficiency of the pump light into the active guiding layer 13 appeared to be about 30%, so that the amount of pump light which actually entered the active guiding layer 13 was about 20 mW. In this experiment, no effort was taken to improve the coupling efficiency, but it will be evident for a skilled person that improvement of the coupling efficiency to about 80% or more is possible. Therefore, it is reasonable to expect that an optical waveguide device with a length of 4 cm, having the structure as described, wherein the active guiding layer 13 has the composition as described, will yield an optical gain of 15 dB or more with a launched pump power of 40 mW or less.

From the experimental data, it was calculated that the upconversion coefficient (as defined and used in the publication "Cooperative upconversion in Erbium implanted sodalime silicate glass optical waveguides" by E. Snoeks et al in J.Opt.Soc.Am.B., 12, 1468 (1995)) of the active guiding layer 13 had a value of about $2.6 \cdot 10^{-18}$ cm$^3$/s. This value is one of the lowest values reported to date.

Further, it was found that in the active guiding layer, the luminescence lifetime of Er was about 7.2 ms.

It will be clear to a person skilled in the art that the invention is not limited to the above-described examples but that variations and modifications will be possible without going beyond the scope of the invention as described in the claims. For instance, although in the examples the active guiding layer 13 is manufactured by way of an RF sputtering process, as an alternative other processes may be used for manufacturing the active guiding layer.

Further, in practice, it may happen that the material of the active guiding layer 13 comprises impurities such as for instance Mg, Ca, Cr, Ba, Zn, Pb, Li, K. Although small amounts of such impurities can be permitted, according to the invention it is preferred that the amounts of such impurities are as low as possible, preferably zero, such that the active guiding layer 13 is composed substantially only of $P_2O_5$, $Al_2O_3$, $Na_2O$, $La_2O_3$ and $Er_2O_3$.

Further, according to an important feature of the invention, the optical device may be provided with at least one element for achieving optical feedback, for instance a mirror or other reflective element, such that the device can function as a laser.

We claim:

1. A planar optical waveguide device, comprising:

a substrate (11);

an active guiding layer (13) arranged on the substrate (11);

a bottom layer (12) arranged between the active guiding layer (13) and the substract (11);

a top cladding layer (14) arranged over the active guiding layer (13);

wherein the active guiding layer (13) has the following composition:

| | |
   |---|---|
   | $Al_2O_3$ | 8–20 mol % |
   | $Na_2O$ | 5–18 mol % |
   | $La_2O_3$ | 6–35 mol % |
   | $R_2O_3$ | >0–6 mol % |
   | $P_2O_5$ | balance | wherein, R represents Erbium (Er), Neodymium (Nd), or Ytterbium (Yb), or a combination or Er+Yb.

2. A planar optical waveguide device according to claim 1, wherein the active guiding layer (13) has the following composition:

| | |
|---|---|
| P$_2$O$_5$ | 42–45 mol % |
| Al$_2$O$_3$ | 16–18 mol % |
| Na$_2$O | 8.5–11 mol % |
| La$_2$O$_3$ | 27–28 mol % |
| Er$_2$O$_3$ | 0.9–1.2 mol % |

3. A planar optical waveguide device according to claim 1, wherein the optical waveguide device is an optical amplifier.

4. A planar waveguide device according to claim 1, wherein the substrate (11) is made of Si, wherein the bottom layer (12) is made of SiO$_2$, and wherein the top cladding layer (14) is made of SiO$_2$.

5. A planar optical waveguide device according to claim 1, wherein the amplification gain for wavelengths of light which results by transition of Er$^{3+}$ ions from the $^4I_{13/2}$ state to the $^4I_{15/2}$ state is at least 4.1 dB/cm with a pump power of no more than 65 mW, and wherein the active guiding layer (13) has a refractive index of 1.54–1.65 at 632.8 nm.

6. An optical device according to claim 1, further comprising at least one optical feedback element such that the device can function as a laser.

7. An optical device according to claim 6, wherein said at least one optical feedback element is a coating mirror.

8. A planar optical waveguide device, comprising:
a substrate (11);
an active guiding layer (13) arranged on the substrate (11);
a bottom layer (12) arranged between the active guiding layer (13) and the substract (11);
a top cladding layer (14) arranged over the active guiding layer (13);
wherein the active guiding layer (13) has the following composition:

| | |
|---|---|
| Al$_2$O$_3$ | 8–20 mol % |
| Na$_2$O | 5–18 mol % |
| La$_2$O$_3$ | 10–30 mol % |
| R$_2$O$_3$ | 0.5–1.5 mol % |
| P$_2$O$_5$ | balance | wherein, R represents Erbium (Er), Neodymium (Nd), or Ytterbium (Yb), or a combination or Er+Yb.

* * * * *